US012664257B2

(12) United States Patent　　　(10) Patent No.:　US 12,664,257 B2
Tanaka et al.　　　　　　　　　　(45) Date of Patent:　Jun. 23, 2026

(54) CONTROL DEVICE, UNAUTHORIZED COMMAND DETECTION METHOD, AND PROGRAM

(71) Applicant: Hitachi, Ltd., Tokyo (JP)

(72) Inventors: Yuki Tanaka, Tokyo (JP); Kotaro Shimamura, Tokyo (JP); Teruaki Sakata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 18/283,413

(22) PCT Filed: Feb. 21, 2022

(86) PCT No.: PCT/JP2022/006972
§ 371 (c)(1),
(2) Date: Sep. 21, 2023

(87) PCT Pub. No.: WO2022/209420
PCT Pub. Date: Oct. 6, 2022

(65) Prior Publication Data
US 2024/0176873 A1　　May 30, 2024

(30) Foreign Application Priority Data
Mar. 29, 2021　(JP) ................................ 2021-055288

(51) Int. Cl.
*G06F 21/54*　　　(2013.01)
*G06F 21/56*　　　(2013.01)
(52) U.S. Cl.
CPC ............ *G06F 21/54* (2013.01); *G06F 21/566* (2013.01)
(58) Field of Classification Search
CPC ................................ G06F 21/54; G06F 21/566
See application file for complete search history.

(56) References Cited

U.S. PATENT DOCUMENTS 11,409,868 B2 *　8/2022　Reid ..................... G06F 21/554
2007/0245419 A1　10/2007　Omahony
(Continued)

FOREIGN PATENT DOCUMENTS

CN　　112069031 A　*　12/2020　............. G06F 16/27
EP　　3 432 184 B1　　4/2020
(Continued)

OTHER PUBLICATIONS

A.M. Fiskiran • R.B. Lee; Runtime execution monitoring (REM) to detect and prevent malicious code execution; IEEE International Conference on Computer Design: VLSI in Computers and Processors, 2004. ICCD 2004. Proceedings. (2004, pp. 452-457); (Year: 2004).*
N. Stojanovski • M. Gusev • D. Gligoroski • S.J. Knapskog; Bypassing Data Execution Prevention on MicrosoftWindows XP SP2; The Second International Conference on Availability, Reliability and Security (ARES'07) (2007, pp. 1222-1226) Authors; (Year: 2007).*
(Continued)

*Primary Examiner* — Luu T Pham
*Assistant Examiner* — Chao Wang
(74) *Attorney, Agent, or Firm* — Crowell & Moring LLP

(57)　　ABSTRACT
The present invention aims to provide a control device that reduces load and can provide early detection of program tampering. A main storage unit 102 stores a main application 107 and illegal command information 108. The main application 107 is an extension program in which target commands, which are at least some of the commands included in a prescribed program, have been converted into extension commands. The illegal command information 108 indicates the target commands. A command monitoring unit 104 compares executed commands, which are commands that have been executed by the CPU 103, and target commands, which are indicated in the illegal command information 108; and determines whether or not an executed command is an illegal command, based on the comparison results.

10 Claims, 11 Drawing Sheets

101

104

(56)        References Cited

U.S. PATENT DOCUMENTS

| 2017/0004303 | A1   |    | 1/2017  | Yan     |            |
|--------------|------|----|---------|---------|------------|
| 2018/0137280 | A1   |    | 5/2018  | Guri et al. |        |
| 2018/0322069 | A1 * |    | 11/2018 | Heinrich | G06F 12/0246 |
| 2019/0020504 | A1 * |    | 1/2019  | Ray      | H04L 27/22 |
| 2020/0174473 | A1 * |    | 6/2020  | Moriya   | G05D 1/0297 |

FOREIGN PATENT DOCUMENTS

| EP | 3 754 526   | A1 |   | 12/2020 |              |
|----|-------------|----|---|---------|--------------|
| JP | 2007535067  | A  | * | 11/2007 |              |
| JP | 2013-228957 | A  |   | 11/2013 |              |
| JP | 2017-505944 | A  |   | 2/2017  |              |
| JP | 2018-22296  | A  |   | 2/2018  |              |
| JP | 2018109908  | A  | * | 7/2018  | G06F 21/552  |

OTHER PUBLICATIONS

Anjum Riaz • Gaurav Kumar • Lavi Tyagi • Yamuna Prasad • Satyadev Ahlawat; Exploring Non-TAP Interfaces for Efficient and Secure Access to IJTAG Network; IEEE Transactions on Device and Materials Reliability (vol. 25, Issue: 1, 2025, pp. 76-84); (Year: 2024).*

International Search Report (PCT/ISA/210) issued in PCT Application No. PCT/JP2022/006972 dated May 17, 2022 with English translation (4 pages).

Japanese-language Written Opinion (PCT/ISA/237) issued in PCT Application No. PCT/JP2022/006972 dated May 17, 2022 with English translation (6 pages).

Extended European Search Report issued in European Application No. 22779647.1 dated Mar. 5, 2025 (7 pages).

* cited by examiner

| index | Instruction |
|-------|-------------|
| 1 | 000000xxxxxxxxxx000xxxxx0110011 |
| 2 | xxxxxxxxxxxxxxxx000xxxxx0010011 |
| 3 | xxxxxxxxxxxxxxxxxxxxxxxxx1101111 |
| 4 | xxxxxxxxxxxxxxxx001xxxxx1100011 |
| ... | ... |

| index | type | Instruction |
|-------|------|-------------|
| 1 | R | 000000xxxxxxxxxx000xxxxx0110011 |
| 2 | I | xxxxxxxxxxxxxxxxx000xxxxx0010011 |
| 3 | J | xxxxxxxxxxxxxxxxxxxxxxxxx1101111 |
| 4 | B | xxxxxxxxxxxxxxxx001xxxxx1100011 |
| ... | ... | ... |

CONTROL DEVICE, UNAUTHORIZED COMMAND DETECTION METHOD, AND PROGRAM

TECHNICAL FIELD

The present disclosure relates to a control device, an unauthorized command detection method, and a program.

BACKGROUND

In recent years, in an embedded system that supports an industrial electronic control device, a load has been increased due to improvement in control performance, tightening of environmental regulations, addition of new calculation processing accompanying autonomy of devices, and the like.

Further, application of autonomous control to a social system has been progressing, and it is necessary to operate an autonomous body such as a self-propelled robot in an area where an unspecified number of people or devices enter. In such a situation, there is a problem that a risk of attack on the autonomous body increases. Thus, a mechanism for preventing the attack on the autonomous body in advance or suppressing an influence of the attack is required. As means for attacking the autonomous body, falsification of a program for controlling the autonomous body has been known.

PTL 1 discloses a technique capable of detecting falsification of a program. In this technique, a behavior pattern of a normal program is recorded as a basic pattern, and then a behavior of the program is recorded during the execution of the program. When the behavior pattern is determined from the behavior of the program, it is confirmed whether or not the behavior pattern coincides with the basic pattern. When these patterns do not coincide with each other, it is determined that the program has been falsified.

CITATION LIST

Patent Literature

PTL 1: JP 2017-505944 A

SUMMARY OF INVENTION

Technical Problem

However, in a case where the behavior pattern of the program is monitored as in the technique described in PTL 1, since the falsification of the program is detected after a series of operations of the program is performed, there is a problem that it takes a long time from the execution of the falsified program to the detection of the falsification. Further, in order to monitor the behavior pattern, it is necessary to record the behavior pattern of the program being executed, read the behavior pattern and the basic pattern recorded in advance, and compare these patterns. Thus, there is also a problem that a load related to monitoring is large. Thus, resources available for original functions such as autonomous control are reduced. Note that, it is also conceivable to compare the behavior pattern with the basic pattern while the original function is stopped. However, in this case, a time required for detecting the falsification becomes longer, and there is a concern that a time required from the occurrence of an abnormal operation to the handling cannot be satisfied.

An object of the present invention is to provide a control device, an unauthorized command detection method, and a program capable of detecting falsification of a program at an early stage while reducing a load.

Solution to Problem

A control device according to one aspect of the present disclosure includes a processor, a main storage unit that stores an extension program executed by the processor and unauthorized command information indicating a target command that is at least a part of commands included in a predetermined program, the extension program being obtained by converting the target command into an extension command, and a command monitoring unit that compares an execution command that is a command executed by the processor with the target command indicated by the unauthorized command information, and determines whether or not the execution command is an unauthorized command based on the comparison result.

Advantageous Effects of Invention

According to the present invention, it is possible to detect the falsification of the program at an early stage while reducing the load.

DESCRIPTION OF EMBODIMENTS

Hereinafter, embodiments of the present disclosure will be described with reference to the drawings. Note that, in the configuration of each embodiment, the same portions or portions having similar functions share the same reference signs in different drawings, and redundant descriptions may be omitted.

First Embodiment

<Overall Configuration of Control Device>

Figure 1:
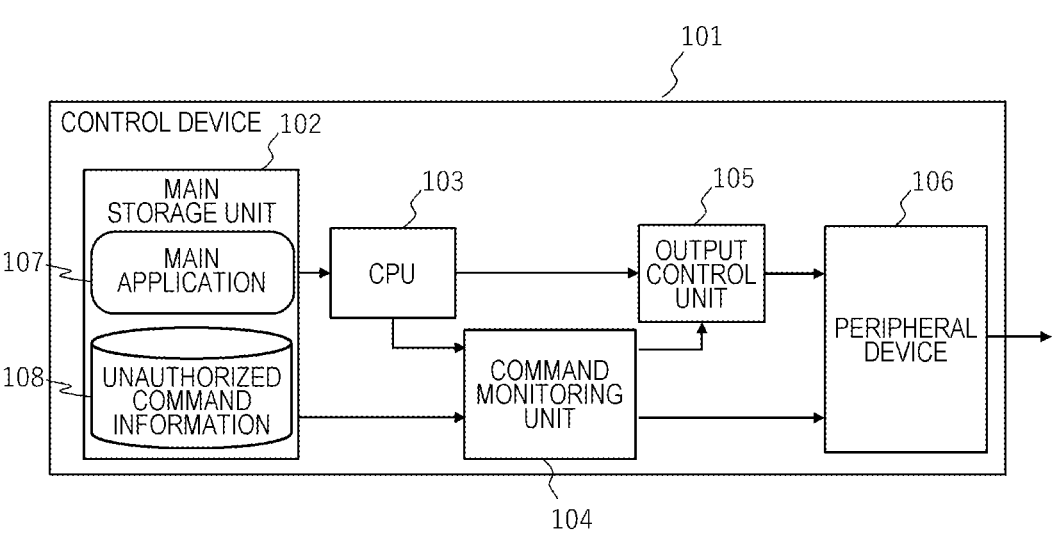
FIG. 1 is a diagram illustrating a configuration example of a control device according to a first embodiment of the present disclosure.

FIG. 1 is a diagram illustrating a configuration example of a control device according to a first embodiment of the present disclosure. A control device 101 illustrated in FIG. 1 includes a main storage unit 102, a CPU 103, a command monitoring unit 104, an output control unit 105, and a peripheral device 106.

The main storage unit 102 stores a main application program (hereinafter, abbreviated as a main application) 107 and unauthorized command information 108. The main application 107 is an extension program obtained by converting a target command that is at least a part of a command included in an original application program (hereinafter, abbreviated as an original application) that is a predetermined program into an extension command to be described later. The original application and the main application 107 are, for example, control programs for controlling a controlled target such as an autonomous body that grasps an own situation and operates. The unauthorized command information 108 is information for detecting falsification of the main application 107, and is information indicating a target command which is a command before conversion of the extension command included in the main application 107.

The CPU 103 is a processor that reads the main application 107 stored in the main storage unit 102, executes each command included in the read main application 107, and performs various calculations. Specifically, the CPU 103 includes a register that retains data to be used for calculation, a calculator that executes calculation by using the data retained in the register, and the like. The CPU 103 acquires the command of the main application 107 from the main storage unit 102, deciphers a bit string of the command, determines the selection of the register and the calculator corresponding to the command and an operation of the calculator, and executes the calculation corresponding to the command.

In a case where the calculation result is output to an outside of the control device 101 such as the controlled target, the CPU 103 outputs, as output data, the calculation result to the output control unit 105. Further, the CPU 103 outputs execution command information indicating an execution command which is an executed command to the command monitoring unit 104.

The command monitoring unit 104 acquires unauthorized command information 108 from the main storage unit 102, and acquires the execution command information from the CPU 103. The command monitoring unit 104 compares the target command indicated by the unauthorized command information 108 with the execution command indicated by the execution command information, and determines whether or not the execution command is an unauthorized command. Specifically, in a case where a value of a feature portion indicating a feature of the command coincides with any of target commands indicated by the execution command by the unauthorized command information 108, the command monitoring unit 104 determines that the execution command is an unauthorized command and determines that the program is falsified.

In a case where the execution command is the unauthorized command, the command monitoring unit 104 outputs an output stop signal to the output control unit 105, stops the output of the CPU 103, and outputs an abnormality notification signal to the peripheral device 106.

The output control unit 105 controls the output of the output data of the CPU 103 to the outside. Specifically, the output control unit 105 transmits the output data from the CPU 103 to the peripheral device 106 in a case where the output stop signal is not received from the command monitoring unit 104, and stops the transmission of the output data in a case where the output stop signal is received.

The peripheral device 106 is an output unit that outputs the output data from the output control unit 105 and the abnormality notification signal from the command monitoring unit 104 to the outside of the control device 101. The transmission method of the output data is, for example, communication via a wireless or wired network. Examples of the transmission method of the abnormality notification signal include lighting of an LED or the like, message communication via a wireless or wired network, and output of ON and OFF signals.

<Configuration of Circuit Generator>

The CPU 103 has an extended configuration for executing an extension command in the main application 107. The extended configuration is a configuration for processing the extension command as a command equivalent to the target command before conversion. The equivalent command is, for example, a command to output an equivalent result.

Figure 2:
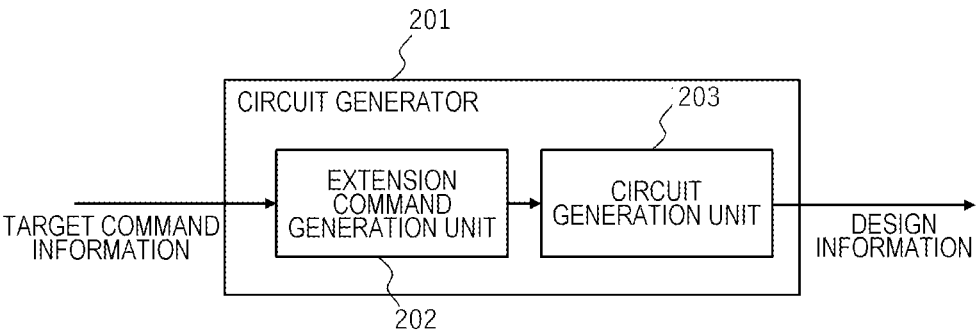
FIG. 2 is a diagram illustrating a configuration example of a circuit generator according to the first embodiment of the present disclosure.

FIG. 2 is a diagram illustrating a configuration of a circuit generator that designs the CPU 103 having the extended configuration. The circuit generator 201 illustrated in FIG. 2 includes an extension command generation unit 202 and a circuit generation unit 203.

Target command information indicating a target command to be converted into an extension command is input to the extension command generation unit 202. The extension command generation unit 202 converts the target command indicated by the target command information into the extension command and notifies the circuit generation unit 203 of the extension command. The extension command is a command to replace bits for designating a calculation method (specifically, the calculator and the operation of the calculator) in the target command with a value for the extension command. Thus, bits for designating a register, an address, and an immediate value of the extension command inherit bits of an original target command. Note that, the bit to be replaced is different for each type of the command. Further, the bits for designating the calculation method are feature portions representing the features of the above-described command.

The circuit generation unit 203 designs a CPU having an extended configuration for processing the extension command notified from the extension command generation unit 202 as the command equivalent to the target command. Specifically, the circuit generation unit 203 designs the CPU having the extended configuration that executes processing according to the calculation method designated by the extension command in accordance with the type of the extension command, and outputs the design information. The CPU generated according to the design information is mounted on the control device 101 as the CPU 103.

In the present embodiment, the circuit generation unit 203 generates design information of a CPU having an extension function by rearranging the design information of the existing CPU that does not need to execute the extension command in accordance with the extension command. In this case, a main recombination portion of the design information is a portion of the circuit that outputs a control signal of each calculator. Note that, the design information of the existing CPU may be stored in advance in the circuit generator 201 or may be input from an outside. Further, the circuit generation unit 203 may be realized by dedicated hardware, or may be realized by software in a computer such as a personal computer.

Note that, as the number of target commands increases, since the number of types of extension commands available in an original function of the CPU 103 (for example, a function of controlling the controlled target) decreases, it is desirable to appropriately set the number of target commands in accordance with the number of commands of the original application and other restrictions.

<Configuration of Command Converter>

Figures 3, 4:
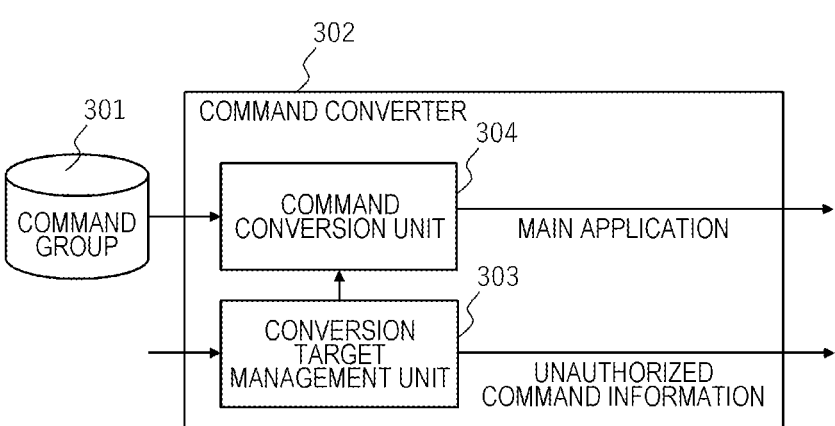
FIG. 3 is a diagram illustrating a configuration example of a command converter according to the first embodiment of the present disclosure.
FIG. 4 is a diagram illustrating a configuration example of unauthorized command information according to the first embodiment of the present disclosure.

FIG. 3 is a diagram illustrating a configuration example of a command converter that generates the main application 107. A command group 301 which is a set of commands included in the original application is input to the command converter 302 illustrated in FIG. 3. Further, the command converter 302 includes a conversion target management unit 303 and a command conversion unit 304.

The conversion target management unit 303 determines, as a target command, a command designated by an instruction from the outside, and generates an extension command corresponding to the target command. The generation method of the extension command is similar to the generation method by the extension command generation unit 202. The conversion target management unit 303 notifies the command conversion unit 304 of the target command and the extension command. Further, the conversion target management unit 303 outputs information indicating the target command as the unauthorized command information 108, and stores the information in the main storage unit 102 of the control device 101 in FIG. 1. Accordingly, in a case where the same command as the target command indicated by the unauthorized command information 108 is executed by the CPU 103, since the executed execution command is not an extension command, it is possible to determine that the execution command is an unauthorized command.

In a case where the target command notified from the conversion target management unit 303 is included in the command group 301, the command conversion unit 304 replaces the target command included in the command group 301 with the extension command notified from the conversion target management unit 303. The command conversion unit 304 outputs, as the main application 107, the command group 301 in which the target command is replaced with the extension command and stores the command group 301 in the main storage unit 102 of the control device 101 of FIG. 1. Note that, the command converter 302 may be realized by dedicated hardware, or may be realized by software in a computer such as a personal computer.

FIG. 4 is a diagram illustrating a configuration example of the unauthorized command information 108. The unauthorized command information 108 illustrated in FIG. 4 indicates a target command (instruction) 108a for each index for specifying the target command. The target command 108a is 32-bit data in the example of FIG. 4. In the unauthorized command information 108, among values of bits of the target command 108a, values other than the feature portion (the bits for designating the calculation method) may be indicated by an indefinite value (in FIG. 4, "x"), but the feature portion indicates an actual value of "0" or "1".

For example, in a first command (index=1), a 31st bit to a 25th bit, a 14th bit to a 12th bit, and a 6th bit to a 0th bit are bits for designating the calculation method. In a case where the command coincides with the execution command with all of these values, it is determined that the execution command is an unauthorized command. Note that, the bits for designating the calculation method are different depending on the type of the command, and for example, a third command (index=3) designates the calculation method with values from a 6th bit to a 0th bit. Note that, the arrangement of the bits illustrated in FIG. 4 is merely an example, and the bits for designating the calculation method are changed in accordance with a command set architecture to be applied or the like.

<Command Monitoring Unit>

Figure 5:
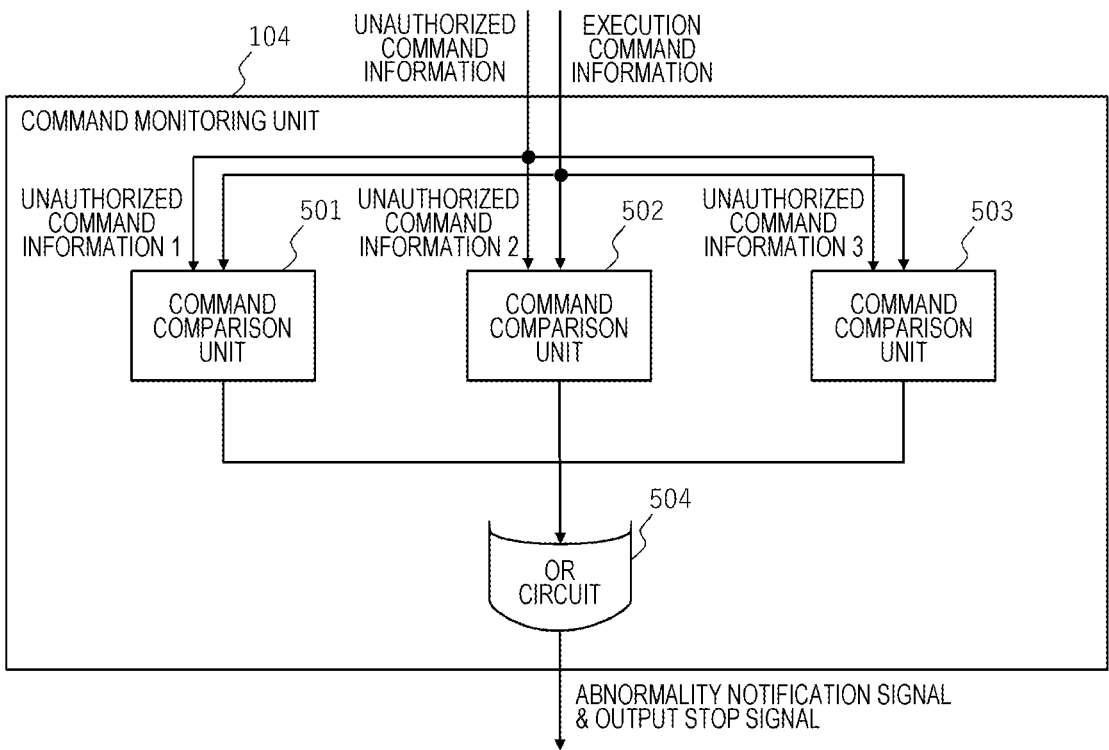
FIG. 5 is a diagram illustrating a configuration example of a command monitoring unit according to the first embodiment of the present disclosure.

FIG. 5 is a diagram illustrating a configuration example of the command monitoring unit 104 illustrated in FIG. 1. The command monitoring unit 104 illustrated in FIG. 5 includes command comparison units 501 to 503 and an OR circuit 504. The command comparison unit is provided for each type of the extension command. The example of FIG. 5 illustrates the command monitoring unit 104 in a case where the target commands with the indexes 1 to 3 in FIG. 4 are converted into the extension commands. Thus, although the number of command comparison units is three in FIG. 5, the number of command comparison units is not limited to three in practice, and is increased or decreased in accordance with the type of the extension command.

Pieces of different unauthorized command information 1 to 3 are input to and retained in the command comparison units 501 to 503. Here, the pieces of unauthorized command information 1 to 3 indicate the target commands with the indexes 1 to 3, respectively. Further, the execution command information is input from the CPU 103 to each of the command comparison units 501 to 503.

Each of the command comparison units 501 to 503 compares the execution command indicated by the execution command information with the target command indicated by the retained unauthorized command information, and determines whether or not all the values of the feature portions are the same. In a case where all the values of the feature portions are the same, each of the command comparison units 501 to 503 determines that the execution command is an unauthorized command. In a case where the issued command is an unauthorized command, each of the command comparison units 501 to 503 outputs, as an abnormality detection signal indicating that an abnormality is detected, an H-level signal having a value of "1" to the OR circuit 504.

In a case where the abnormality detection signal is output from at least one of the command comparison units 501 to 503, the OR circuit 504 outputs, as an abnormality notification signal and an output stop signal, the abnormality detection signal to the command monitoring unit 104 and the output control unit 105.

<Command Comparison Unit>

Figure 6:
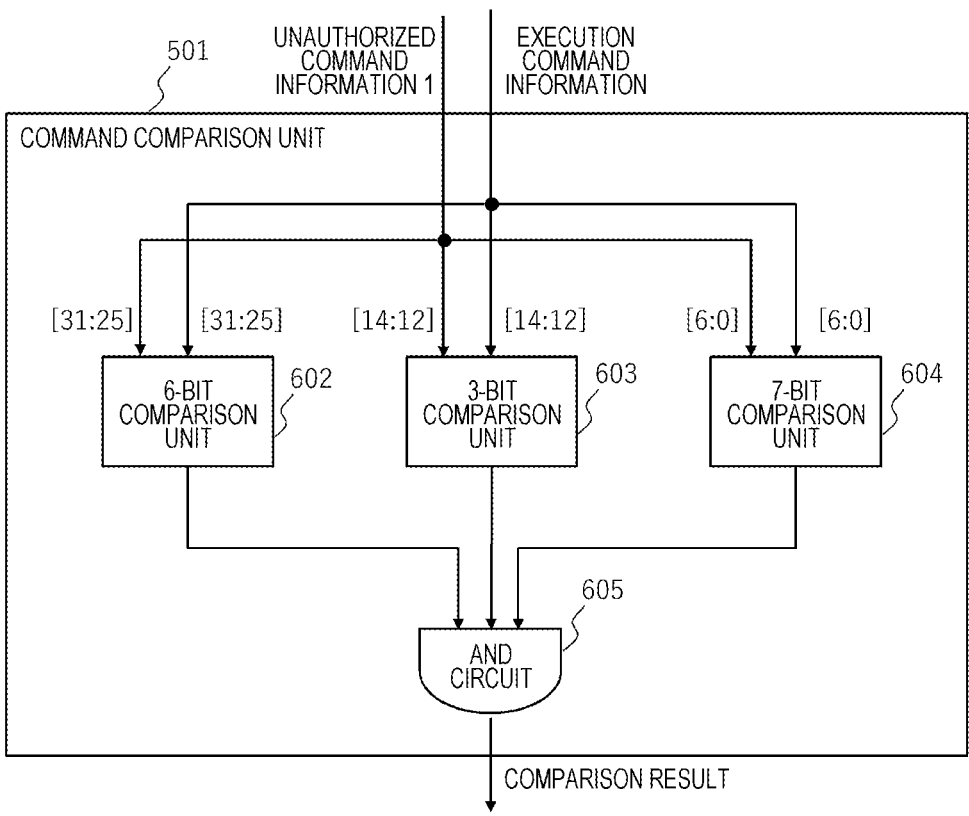
FIG. 6 is a diagram illustrating a configuration example of a command comparison unit according to the first embodiment of the present invention.
Figure 7:
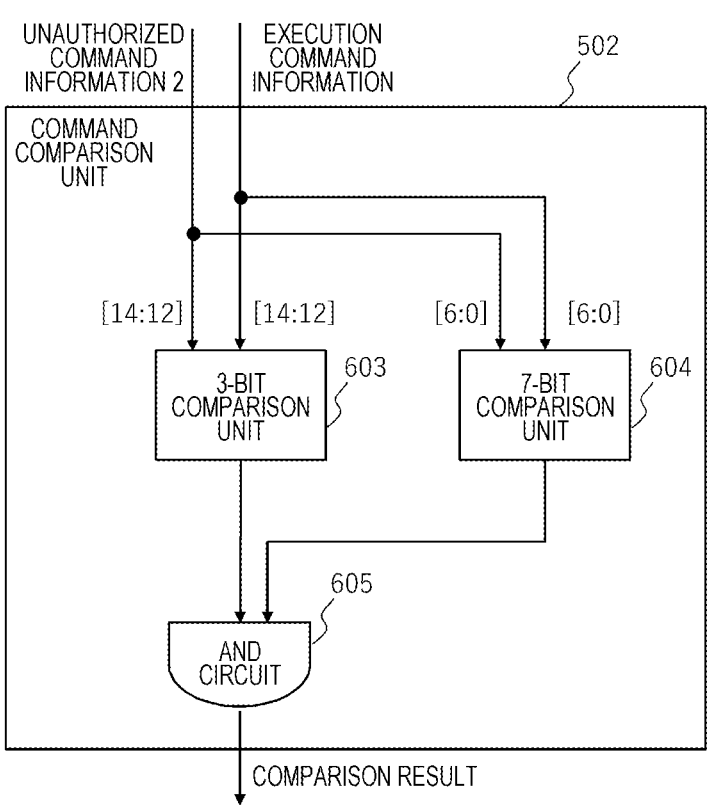
FIG. 7 is a diagram illustrating another configuration example of the command comparison unit according to the first embodiment of the present disclosure.
Figure 8:
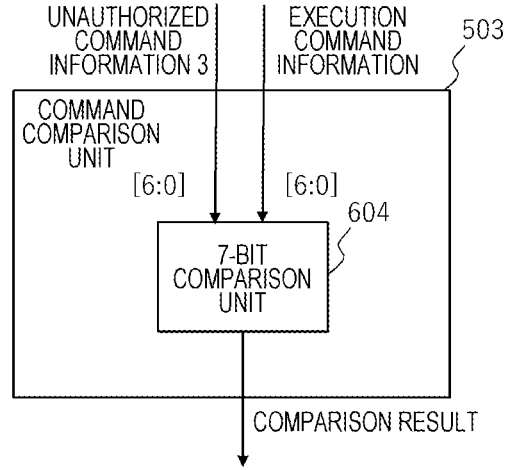
FIG. 8 is a diagram illustrating still another configuration example of the command comparison unit according to the first embodiment of the present disclosure.

FIGS. 6 to 8 are diagrams illustrating configuration examples of the command comparison units 501 to 503 in FIG. 5.

FIG. 6 illustrates a configuration example of the command comparison unit 501. The command comparison unit 501 is a command comparison unit corresponding to the unauthorized command information 1 with an index of 1 in FIG. 4, and includes a 6-bit comparison unit 602, a 3-bit comparison unit 603, and a 7-bit comparison unit 604 which are comparators for comparing bits of portions different from each other in the execution command and the target command, and an AND circuit 605.

The 6-bit comparison unit 602 compares a 31st bit to a 25th bit of the target command indicated by the unauthorized command information 108 with a 31st bit to a 25th bit of the execution command indicated by the execution command information, and outputs an abnormality notification signal to the AND circuit 605 in a case where all the values coincide. The 3-bit comparison unit 603 compares a 14th bit to a 12th bit of the target command with a 14th bit to a 12th bit of the execution command, and outputs an abnormality notification signal to the AND circuit 605 in a case where all the values coincide. The 7-bit comparison unit 604 compares a 6th bit to a 0th bit of the unauthorized command with a 6th bit to a 0th bit of the execution command information, and outputs an abnormality notification signal to the AND circuit 605 in a case where all the values coincide.

In a case where the abnormality detection signals are output from all the comparison units (6-bit comparison unit 602, 3-bit comparison unit 603, and 7-bit comparison unit 604), the AND circuit 605 outputs the abnormality detection signal as the comparison result.

FIG. 7 illustrates a configuration example of the command comparison unit 502. The command comparison unit 502 is a command comparison unit corresponding to the unauthorized command information 2 with an index of 2 in FIG. 4, and has a configuration in which the 6-bit comparison unit 602 is removed from the command comparison unit 501 illustrated in FIG. 6. Thus, the command comparison unit 502 outputs the abnormality notification signal in a case where the 14th bit to the 12th bit between the target command and the execution command coincide and the 6th bit to the 0th bit in the target command and the execution command coincide.

FIG. 8 illustrates a configuration example of the command comparison unit 503. The command comparison unit 503 is a command comparison unit corresponding to the unauthorized command information with an index of 3 in FIG. 4, and has a configuration in which the 3-bit comparison unit 603 and the AND circuit 605 are removed from the command comparison unit 502 illustrated in FIG. 7. Thus, the command comparison unit 503 outputs the abnormality notification signal in a case where the 6th bit to the 0th bit between the target command and the execution command coincide.

Effects of Embodiment

As described above, according to the present embodiment, the main storage unit 102 stores the main application 107 and the unauthorized command information 108. The main application 107 is an extension program obtained by converting the target command that is at least a part of the command included in the predetermined program into the extension command. The unauthorized command information 108 indicates the target command. The command monitoring unit 104 compares the execution command which is the command executed by the CPU 103 with the target command indicated by the unauthorized command information 108, and determines whether or not the execution command is the unauthorized command based on the comparison result.

With the above configuration, it is possible to monitor the falsification of the program in units of commands when the program is executed. Thus, it is not necessary to record, read, and compare action patterns, and thus, it is possible to reduce a load related to monitoring processing. Further, since the falsification of the program can be detected without waiting for the confirmation of the action pattern, the time required for detecting the falsification can be shortened. Accordingly, it is possible to detect the falsification of the program at an early stage while reducing the load.

Further, in the present embodiment, the CPU 103 has an extended configuration for processing the extension command as the command equivalent to the target command. Thus, it is possible to handle the extension program as being equivalent to the original program.

Further, in the present embodiment, the processor is designed in accordance with the extension command. Thus, it is possible to reduce the restriction on the command available as the extension command.

Further, in the present embodiment, the command monitoring unit 104 includes the comparators 602 to 604 that compare bits of feature portions having different values between the target command and the extension command in the execution command and the target command. Thus, since it is possible to configure the command monitoring unit 104 in accordance with the extension command, it is possible to reduce the load of the monitoring processing.

Second Embodiment

The present embodiment is different from the first embodiment in a configuration of a command monitoring unit 104. Specifically, the command monitoring unit 104 includes a plurality of command comparison units having a common configuration, and changes a portion to be compared between a target command and an execution command in accordance with a type of the target command. Thus, an unauthorized command information 108 includes the type of the target command.

Figure 9:
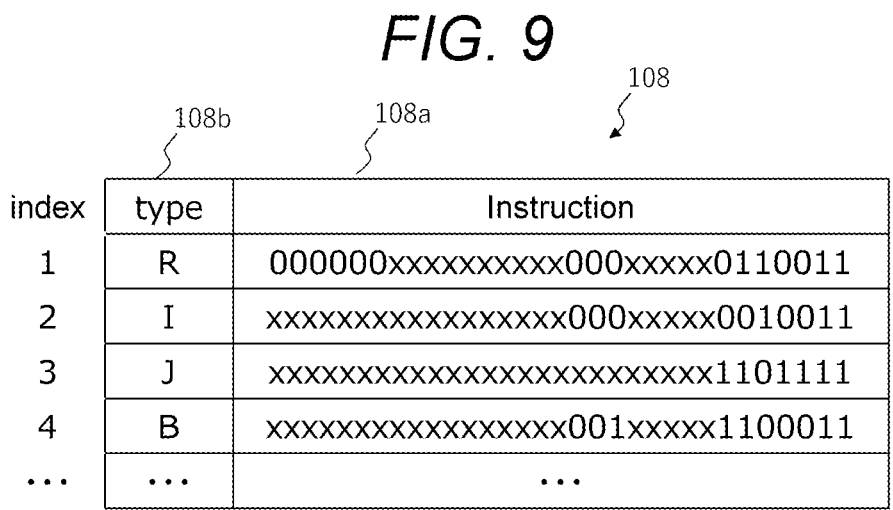
FIG. 9 is a diagram illustrating a configuration example of unauthorized command information according to a second embodiment of the present disclosure.

FIG. 9 is a diagram illustrating a configuration example of the unauthorized command information 108 including a type of a command. The unauthorized command information 108 illustrated in FIG. 9 indicates a target command 108a and a type (Type) 108b of the target command 108a for each index. The target command 108a is equivalent to the target command 108a illustrated in FIG. 4.

Figure 10:
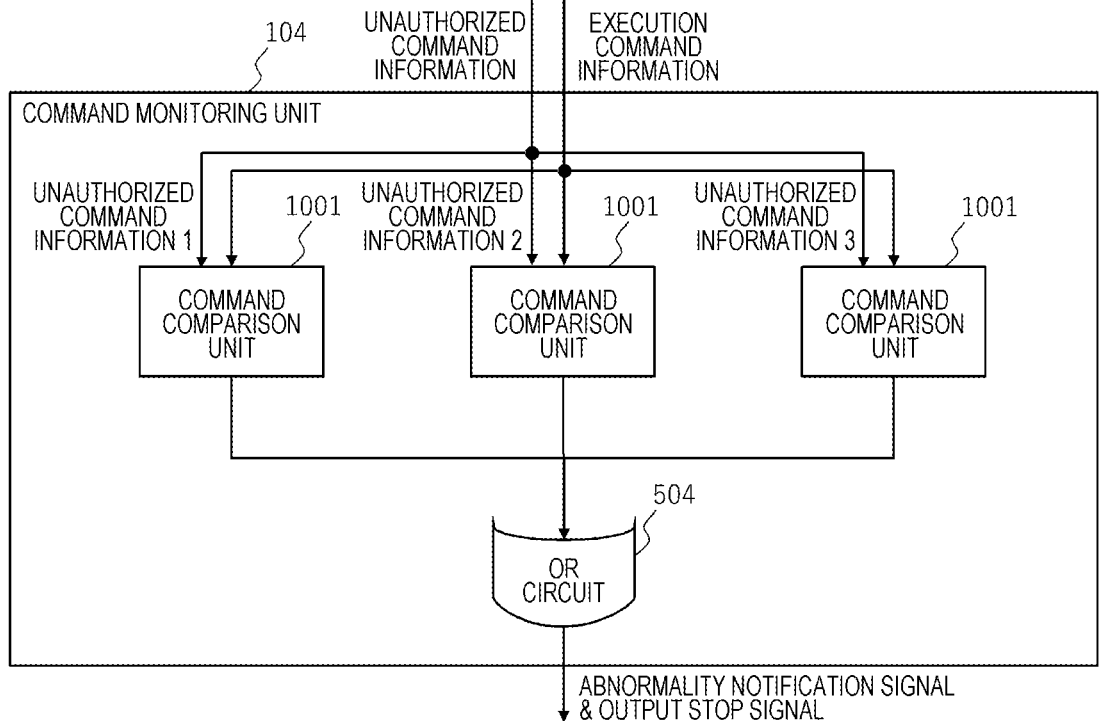
FIG. 10 is a diagram illustrating a configuration example of a command monitoring unit according to the second embodiment of the present disclosure.

FIG. 10 is a diagram illustrating a configuration example of the command monitoring unit 104 of the present embodiment. The command monitoring unit 104 illustrated in FIG. 10 includes one or a plurality of command comparison units 1001 and an OR circuit 504. In a case where there are a plurality of command comparison units 1001, the configurations thereof are common. The example of FIG. 10 illustrates the command monitoring unit 104 in a case where target commands with indexes 1 to 3 in FIG. 9 are converted into extension commands. Thus, in FIG. 10, there are three command comparison units 1001, but the number of command comparison units 1001 is not limited to three in practice, and is increased or decreased in accordance with the type of the extension command.

Pieces of different unauthorized command information 1 to 3 are input to and retained in the command comparison units 1001. Further, execution command information from the CPU 103 is input to each command comparison unit 1001.

Each command comparison unit 1001 compares the execution command indicated by the execution command information with the target command indicated by the retained unauthorized command information, and determines whether or not all values of the feature portions are the same. In a case where all the values of the feature portions are the same, each command comparison unit 1001 determines that the execution command is an unauthorized command. In a case where the issued command is an unauthorized command, each of the command comparison units 1001 outputs, as an abnormality detection signal indicating that an abnormality is detected, an H-level signal having a value of "1" to the OR circuit 504.

<Command Comparison Unit>

Figure 11:
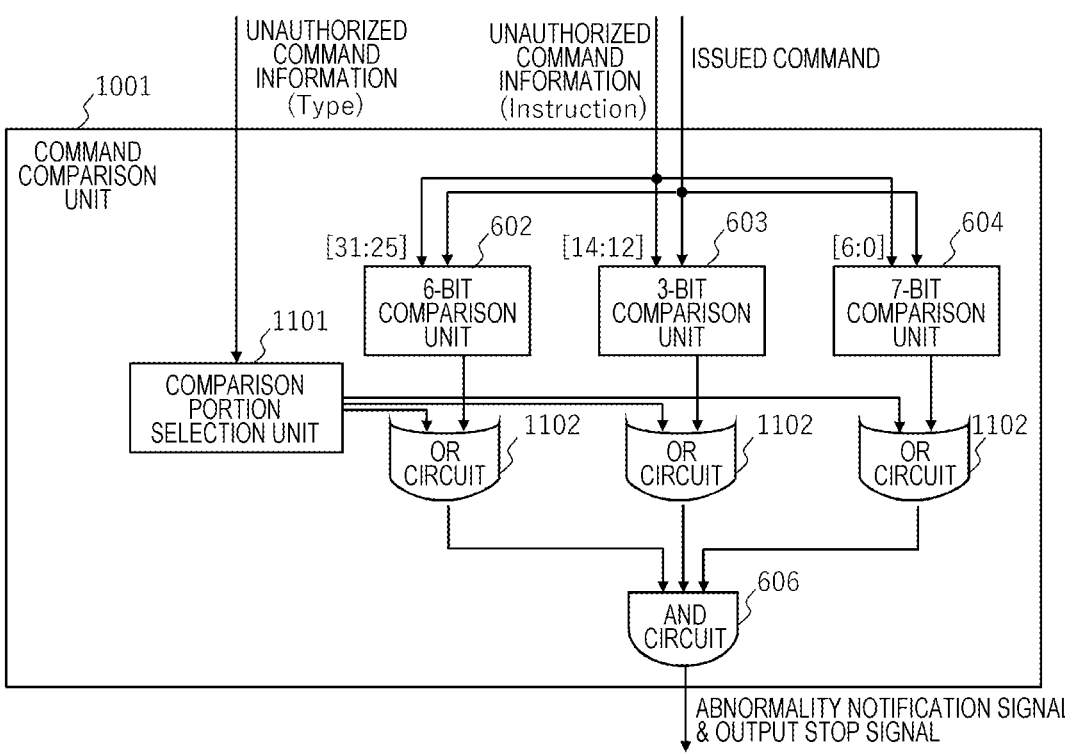
FIG. 11 is a diagram illustrating a configuration example of a command comparison unit according to the second embodiment of the present disclosure.

FIG. 11 is a diagram illustrating a configuration example of the command comparison unit 1001. The command comparison unit 1001 illustrated in FIG. 11 further includes a comparison portion selection unit 1101 and a plurality of OR circuits 1102 in addition to the configuration of the command comparison unit 501 illustrated in FIG. 6. The OR circuits 1102 are provided to correspond to a 6-bit comparison unit 602, a 3-bit comparison unit 603, and a 7-bit comparison unit 604, and are connected to an output terminal of the corresponding comparison unit. Accordingly, in the example of FIG. 11, there are three OR circuits 1102.

The type 108b of the unauthorized command information 108 is input to the comparison portion selection unit 1101. The comparison portion selection unit 1101 determines which of the 6-bit comparison unit 602, the 3-bit comparison unit 603, and the 7-bit comparison unit 604 is used as a use comparator to be used for determining whether or not the execution command is an unauthorized command in accordance with the type 108b of the command. As a selection signal for selecting the use comparator, the comparison portion selection unit 1101 outputs an L-level signal having a value of "0" to the OR circuit 1102 corresponding to the use comparison unit, and outputs an H-level signal having a value of "1" to the OR circuit 1102 corresponding to the comparator which is not the use comparator.

Accordingly, the H-level signal is constantly output from the OR circuit 1102 corresponding to the comparator that is not the use comparator, and the H-level signal is output from the OR circuit 1102 corresponding to the use comparator in a case where the abnormality detection signal (H-level signal) is output from the use comparator. Accordingly, in a case where the abnormality detection signal is output from the use comparator, the abnormality detection signal is output as the comparison result from an AND circuit 605.

Effects of Embodiment

As described above, according to the present embodiment, the comparator used to determine whether or not the execution command is an unauthorized command is selected in accordance with the type of the target command. Thus, since it is not necessary to change the configuration of the command monitoring unit 104 in accordance with the type of the target command, it is not necessary to change the configuration of the command monitoring unit 104 even though a main application 107 or the like is changed.

Accordingly, it is possible to detect the falsification of the program at an early stage while the update and replacement speed of the main application are maintained.

Third Embodiment

In the present embodiment, an example in which an extension command and a CPU are designed in accordance with target command information will be described.

Figure 12:
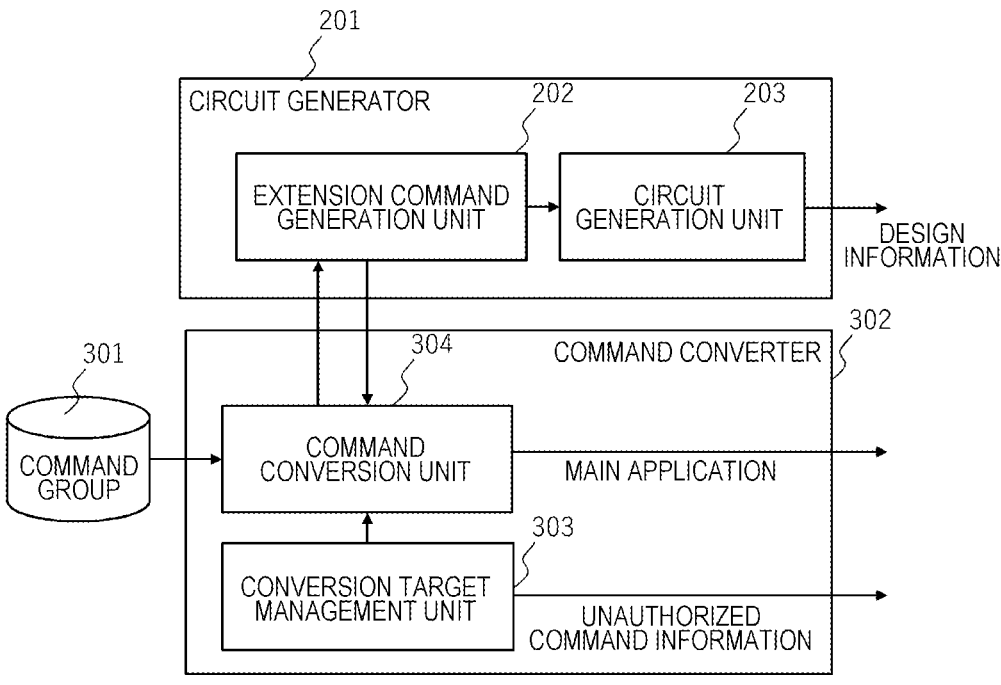
FIG. 12 is a diagram illustrating a configuration example of a circuit generator and a command converter according to a third embodiment of the present disclosure.

FIG. 12 is a diagram illustrating configurations of a circuit generator 201 and a command converter 302 of the present embodiment. In the present embodiment, as illustrated in FIG. 12, the circuit generator 201 and the command converter 302 are connected to communicate with each other.

A conversion target management unit 303 of the command converter 302 retains target command information indicating a target command, transmits the target command information to an extension command generation unit 202 of the circuit generator 201 via a command conversion unit 304, and outputs the target command information as unauthorized command information 108.

The extension command generation unit 202 generates an extension command based on the target command information. The circuit generation unit 203 designs a CPU having an extended configuration for processing the extension command as a command equivalent to the target command based on the extension command, and outputs design information.

Further, the extension command generation unit 202 notifies the command conversion unit 304 of command conversion information indicating the extension command and the target command. In a case where the target command indicated by the command conversion information is included in a command group 301, the command conversion unit 304 replaces the target command included in the command group 301 with the extension command indicated by the command conversion information. The command conversion unit 304 outputs, as a main application 107, the command group 301 in which the target command is replaced with the extension command.

Effects of Embodiment

As described above, according to the present embodiment, the extension command is generated based on the target command, and the CPU 103 is designed based on the extension command. Thus, since it is possible to appropriately set an extension command for monitoring the falsification of the program, it is possible to set an appropriate extension command corresponding to a tendency of a predetermined program to be used or malware to be monitored.

Fourth Embodiment

In the present embodiment, a command to be converted is determined in accordance with a command tendency by a main application 107.

Figure 13:
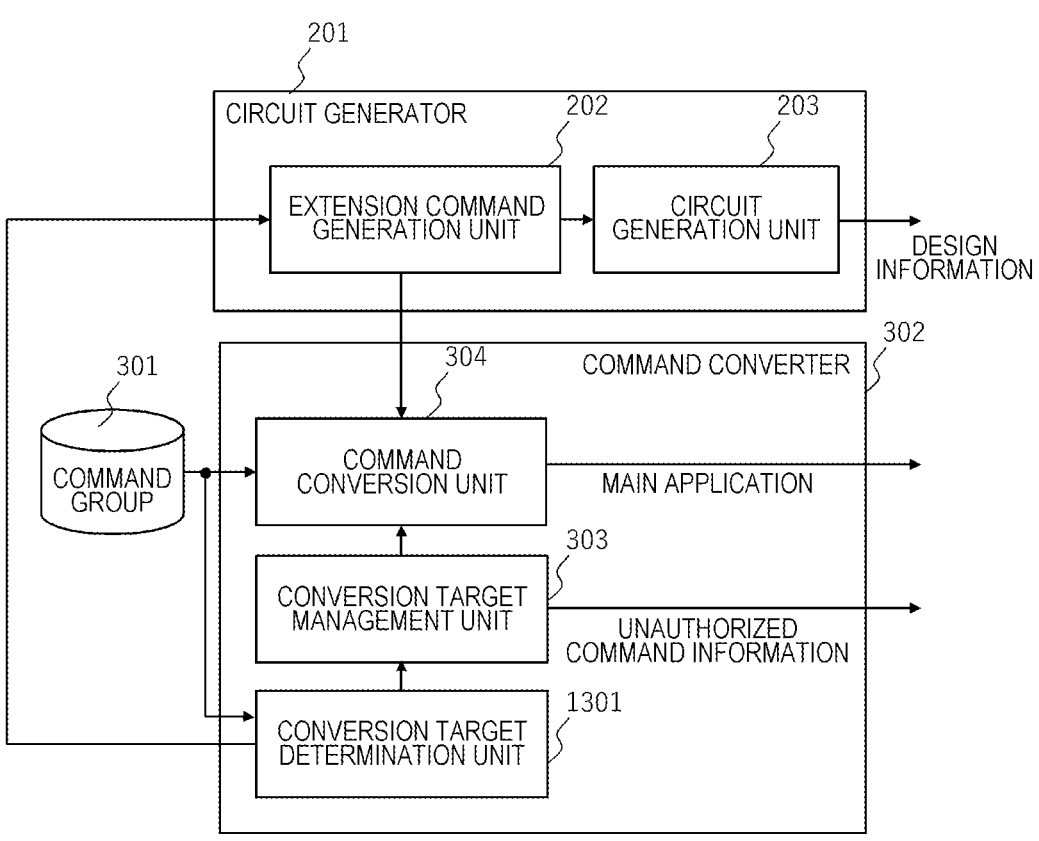
FIG. 13 is a diagram illustrating a configuration example of a circuit generator and a command converter according to a fourth embodiment of the present disclosure.

FIG. 13 is a diagram illustrating a configuration example of a circuit generator 201 and a command converter 302 of the present embodiment. The configuration illustrated in FIG. 13 is different from the configuration illustrated in FIG. 12 in that the command converter 302 further includes a conversion target determination unit 1301.

A command group 301 is input to the conversion target determination unit 1301. The conversion target determination unit 1301 determines a target command from the command group 301 according to a predetermined determination condition. The determination condition is, for example, a condition related to a use frequency of each command included in the command group 301 in an original application. More specifically, the determination condition is a command whose use frequency is equal to or higher than a threshold value, or a predetermined number of commands in descending order of use frequency. The use frequency may be an appearance frequency in a source code of the original application, or may be an execution frequency when the original application is executed by a personal computer or an actual control device 101. Note that, the determination condition is not limited to the condition related to the use frequency, and may be a command corresponding to a predetermined priority order.

The conversion target determination unit 1301 determines a command conforming to the determination condition as a target command, and outputs target command information indicating the target command to an extension command generation unit 202 and a conversion target management unit 303.

The extension command generation unit 202 generates an extension command based on the target command information from the conversion target determination unit 1301, and outputs extension command information indicating the extension command to the command conversion unit 304.

Further, the conversion target management unit 303 outputs the target command information from the conversion target determination unit 1301 to the command conversion unit 304, and outputs the target command information as unauthorized command information 108. In a case where the target command indicated by the target conversion information is included in the command group 301, the command conversion unit 304 replaces the target command included in the command group 301 with the extension command indicated by the extension command information. The command conversion unit 304 outputs, as a main application 107, the command group 301 in which the target command is replaced with the extension command. The other processing is similar to the processing of the third embodiment.

Figure 14:
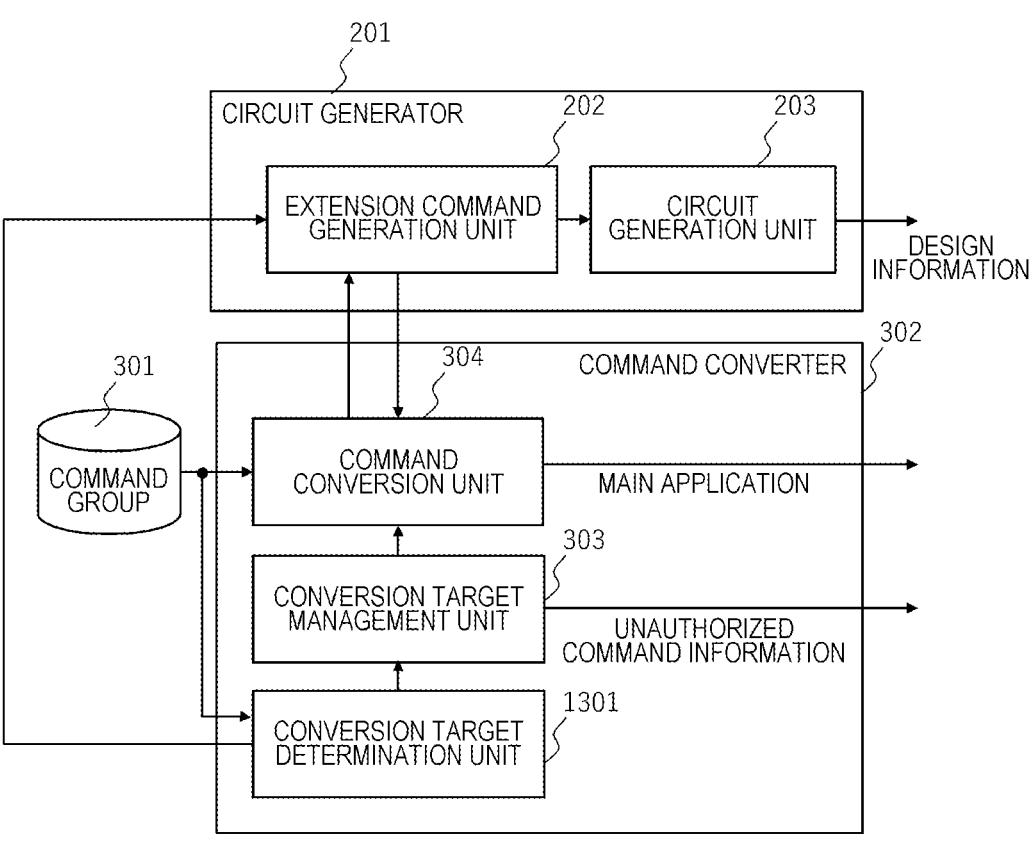
FIG. 14 is a diagram illustrating another configuration example of the circuit generator and the command converter according to the fourth embodiment of the present disclosure.

FIG. 14 is a diagram illustrating another configuration example of the circuit generator 201 and the command converter 302 of the present embodiment. In the example of FIG. 14, in addition to the target command determined by the conversion target determination unit 1301, the target command indicated by the target command information retained in advance by the conversion target management unit 303 is converted into the extension command.

Specifically, the conversion target determination unit 1301 determines the command conforming to the determination condition as the target command, and outputs first target command information indicating the target command to the extension command generation unit 202 and the conversion target management unit 303.

The conversion target management unit 303 retains second target command information indicating the target command, and transmits the second target command information and the first target command information from conversion target determination unit 1301 to the extension command generation unit 202 of the circuit generator 201 via the command conversion unit 304, and outputs the second target command information and the first target command information as the unauthorized command information 108.

The extension command generation unit 202 generates the extension command based on the first target command information from the conversion target determination unit 1301 and the second target command information from the conversion target management unit 303, and notifies the command conversion unit 304 of the command conversion information indicating the extension command and the target command indicated by the first target command information and the second target command information. In a case where the target command indicated by the command conversion information is included in a command group 301, the command conversion unit 304 replaces the target command included in the command group 301 with the extension command indicated by the command conversion information. The command conversion unit 304 outputs, as a main application 107, the command group 301 in which the target command is replaced with the extension command. The other processing is similar to the processing of the third embodiment.

Effects of Embodiment

As described above, according to the present embodiment, the target command includes the command conforming to the predetermined determination condition among the commands included in the command group 301 of the original application. Thus, it is possible to select the appropriate target command. In particular, in the present embodiment, since the determination condition relates to the use frequency of the command, it is possible to select the appropriate target command for early detection of the unauthorized command.

Fifth Embodiment

In the present embodiment, an example in which a command monitoring unit 104 is provided inside a CPU 103 will be described.

Figure 15:
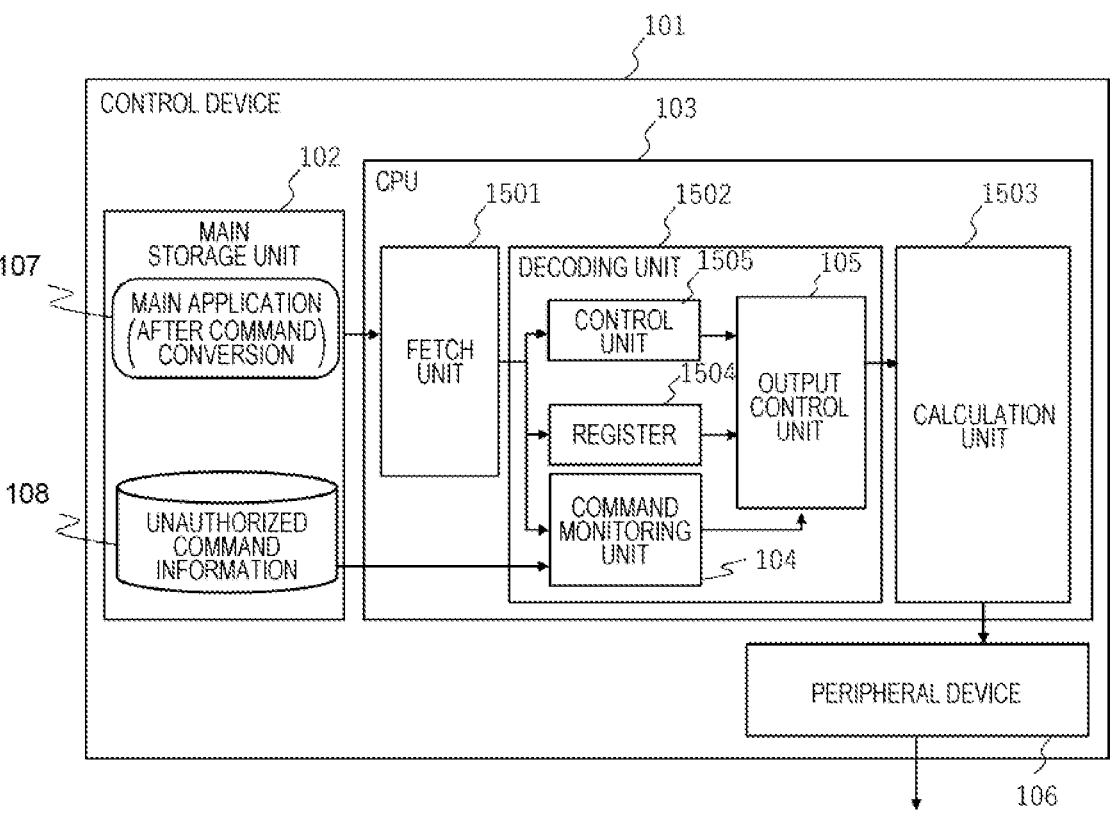
FIG. 15 is a diagram illustrating a configuration example of a control device according to a fifth embodiment of the present disclosure.

FIG. 15 is a diagram illustrating a configuration example of a control device according to a fifth embodiment of the present disclosure. In the example of FIG. 15, the CPU 103 includes a fetch unit 1501, a decoding unit 1502, and a calculation unit 1503.

The fetch unit 1501 acquires, as an execution command, a command of a main application 107. The decoding unit 1502 interprets an operation of the command acquired by the fetch unit 1501. The calculation unit 1503 executes processing according to the operation interpreted by the decoding unit 1502.

Specifically, the decoding unit 1502 includes a control unit 1505, a register 1504, a command monitoring unit 104, and an output control unit 105. The control unit 1505 interprets an operation of an execution command acquired by the fetch unit 1501. For example, the control unit 1505 determines a calculator to be operated according to the execution command and an operation of the calculator. The register 1504 outputs a value retained in a register to be used in the processing by the execution command acquired by the fetch unit 1501. The command monitoring unit 104 compares the execution command with the target command indicated by the unauthorized command information 108, and inputs an output stop signal to the output control unit 105 in a case where the execution command is an unauthorized command. The output control unit 105 stops the calculation and output by the calculation unit 1503 based on the unauthorized command by clearing a value of the signal output to the calculation unit 1503.

Effects of Embodiment

As described above, in the present embodiment, since the unauthorized command can be monitored inside the CPU 103, the operation of the calculation unit 1503 can be stopped. Accordingly, it is possible to suppress the calculation by the unauthorized command, and it is possible to reduce power consumption. Further, since it is possible to monitor the unauthorized command without outputting a signal to the outside of the CPU 103, it is possible to suppress a transmission delay of information. Accordingly, it is possible to suppress a decrease in a frequency of the control device 101.

The above-described embodiment of the present disclosure is an example for describing the present disclosure, and is not intended to limit the scope of the present disclosure only to the embodiment. Those skilled in the art can implement the present disclosure in various other aspects without departing from the scope of the present disclosure.

REFERENCE SIGNS LIST

101 control device
102 main storage unit
103 CPU
104 command monitoring unit
105 output control unit
106 peripheral device
107 main application program
108 unauthorized command information
201 circuit generator
201 circuit generation unit
202 extension command generation unit
203 circuit generation unit
301 command group
302 command converter
303 conversion target management unit
304 command conversion unit
501 to 503 command comparison unit
504 OR circuit
602 6-bit comparison unit
603 3-bit comparison unit
604 7-bit comparison unit
605 AND circuit
1001 command comparison unit
1101 comparison portion selection unit
1102 OR circuit
1301 conversion target determination unit
1501 fetch unit
1502 decoding unit
1503 calculation unit
1504 register
1505 control unit

The invention claimed is:

1. A control device comprising:

a processor;

a memory that stores an extension program executed by the processor and unauthorized command information indicating a target command that is at least a part of commands included in a predetermined program, the extension program being obtained by converting the target command into an extension command; and a command monitoring circuit that compares an execution command that is a command executed by the processor with the target command indicated by the unauthorized command information, and determines whether or not the execution command is an unauthorized command based on the comparison result, wherein the command monitoring circuit includes one or more command comparison circuits, each including a plurality of hardware comparators configured to compare bit values at fixed bit positions of a feature portion of the execution command with corresponding bit values at fixed bit positions of a feature portion of the target command, and a logic circuit configured to output an abnormality detection signal when all compared bit values match, and the command monitoring circuit is configured such that, in response to output of the abnormality detection signal, an output control circuit of the control device is forcibly caused to stop output of the processor, wherein the comparison is performed for each execution command during execution of the extension program without recording or comparing behavior patterns, thereby providing early-stage unauthorized command detection in real-time operation and reducing processing load, and wherein the comparison is limited to bit positions designating a calculation method of the command, and an output of the processor is forcibly stopped before execution output is transmitted, when those calculation-method bits fully match the target command, wherein the target command includes a command conforming to a predetermined determination condition among the commands included in the predetermined program, and the determination condition includes a condition related to a use frequency of each command in the predetermined program.

2. The control device according to claim 1, wherein the processor has an extended configuration for processing the extension command as a command equivalent to the target command.

3. The control device according to claim 2, wherein the extension command is created based on the target command, and the processor is designed based on the extension command.

4. The control device according to claim 1, wherein the command monitoring circuit includes a command comparison circuit that includes a comparator that compares specified bit ranges in feature portions having different values between the target command and the extension command in the execution command and the target command.

5. The control device according to claim 1, wherein the command monitoring circuit includes a plurality of comparators that compare specified bit ranges of portions different from each other between the execution command and the target command, and a selection circuit that selects a comparator associated with determining whether or not the execution command is the unauthorized command from among the plurality of comparators in accordance with a type of the target command.

6. The control device according to claim 1, wherein the command monitoring circuit is provided inside the processor.

7. The control device according to claim 1, wherein the command monitoring circuit uses the abnormality detection signal to stop an output of the processor in a case where the execution command is the unauthorized command.

8. The control device according to claim 1, wherein the extension program is a program for controlling an autonomous body.

9. An unauthorized command detection method by a control device that includes a processor and a memory that stores an extension program executed by the processor and unauthorized command information indicating a target command that is at least a part of commands included in a predetermined program, the extension program being obtained by converting the target command into an extension command, the method comprising:

comparing execution command information indicating an execution command that is a command executed by the processor with the unauthorized command information; and determining whether or not the execution command is an unauthorized command based on the comparison result, wherein the comparing includes comparing, using a plurality of hardware comparators, bit values at fixed bit positions of a feature portion of the execution command with corresponding bit values at fixed bit positions of a feature portion of the target command, outputting an abnormality detection signal when all compared bit values match, and forcibly stopping output of the processor by an output controller of the control device in response to the abnormality detection signal, wherein the comparing and stopping are performed for each execution command during execution of the extension program without recording or comparing behavior patterns, thereby providing early-stage unauthorized command detection in real-time operation and reducing processing load, and wherein the comparison is limited to bit positions designating a calculation method of the command, and an output of the processor is forcibly stopped before execution output is transmitted, when those calculation-method bits fully match the target command, wherein the target command includes a command conforming to a predetermined determination condition among the commands included in the predetermined program, and the determination condition includes a condition related to a use frequency of each command in the predetermined program.

10. A non transitory computer readable storage program storing instructions, which when executed by a processor execute the unauthorized command detection method according to claim 9.

* * * * *